(12) United States Patent
Raney

(10) Patent No.: US 7,570,202 B2
(45) Date of Patent: Aug. 4, 2009

(54) POLARIMETRIC SELECTIVITY METHOD FOR SUPPRESSING CROSS-TRACK CLUTTER IN SOUNDING RADARS

(75) Inventor: Russell K. Raney, Annapolis, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 12/121,841

(22) Filed: May 16, 2008

(65) Prior Publication Data

US 2008/0284640 A1    Nov. 20, 2008

Related U.S. Application Data

(60) Provisional application No. 60/938,226, filed on May 16, 2007.

(51) Int. Cl.
*G01S 13/89* (2006.01)
(52) U.S. Cl. .................. 342/188; 342/25 f; 342/159; 342/162
(58) Field of Classification Search .............. 342/25 R, 342/25 A–25 F, 159–162, 188
See application file for complete search history.

(56) References Cited

U.S. PATENT DOCUMENTS

| | | | |
|---|---|---|---|
| 3,665,466 A | 5/1972 | Hibbard | |
| 4,315,264 A | 2/1982 | Duhammel | |
| 4,329,687 A * | 5/1982 | Kloevekorn et al. | 342/136 |
| 4,766,435 A | 8/1988 | Wells | |
| 4,928,131 A * | 5/1990 | Onozawa | 342/188 |
| 5,164,738 A | 11/1992 | Walter et al. | |
| 5,179,383 A | 1/1993 | Raney et al. | |
| 5,231,404 A * | 7/1993 | Gasiewski | 342/351 |
| 5,300,933 A * | 4/1994 | Discenza et al. | 342/36 |
| 5,557,277 A | 9/1996 | Tricoles et al. | |
| 5,736,957 A | 4/1998 | Raney | |
| 5,764,182 A * | 6/1998 | Durand | 342/188 |
| 5,805,106 A * | 9/1998 | Baum | 342/159 |
| 5,886,662 A * | 3/1999 | Johnson | 342/25 A |
| 6,188,346 B1 | 2/2001 | Waho et al. | |
| 6,657,577 B1 | 12/2003 | Gregersen et al. | |
| 6,750,805 B1* | 6/2004 | Cameron | 342/90 |
| 6,762,713 B1 | 7/2004 | McMillan et al. | |
| 6,967,617 B1 | 11/2005 | McMillan et al. | |
| 7,034,939 B2 * | 4/2006 | Russell et al. | 356/366 |
| 7,227,638 B2 * | 6/2007 | Russell et al. | 356/367 |
| 2007/0143036 A1 | 6/2007 | Stratis et al. | |
| 2008/0284640 A1* | 11/2008 | Raney | 342/159 |

OTHER PUBLICATIONS

Pascale Dubois-Fernandez et al., The Specificity of P Band Polinsar Data Over Vegetation; Polinsar, Frascati, Italy 2007.

(Continued)

*Primary Examiner*—John B Sotomayor
(74) *Attorney, Agent, or Firm*—Francis A. Cooch

(57) ABSTRACT

Methods for suppressing cross-track clutter in a sounding radar utilize polarimetric selectivity in two ways: (1) transmitting full-beam circular polarization and separating the desired signal of interest from the clutter based on the signal and clutter having different polarizations, and (2) transmitting and receiving circular polarization at the radar's nadir and elliptical polarization at the radar's off-nadir regions and filtering out the elliptical polarization.

7 Claims, 1 Drawing Sheet

OTHER PUBLICATIONS

Karl Tragl; Polarimetric Radar Backscattering from Reciprocal Random Targets; IEEE Transactions on Geoscience and Remote Sensing, vol. 28 No. 5, Sep. 1990; pp. 856-864.

V. Chandrasek et al., Analysis and Interpretation of Dual-Polarized Radar Measurements . . . ; 1994 American Meterological Society; pp. 323-336.

Enrico Torlaschi et al., A Comparison of different Polarization Schemes . . . ; Radio Science, Viol. 33, No. 5, p. 1335-1352, Sep.-Oct. 1998.

Howard A. Zebker et al., Decorrelation in interferometric Radar Echoes; IEEE Transactions on Geoscience and Remote Sensing, vol. 30 No. 5, Sep. 1992.

Shane Robert Clloude et al., An Entropy Based Classification Scheme . . . ; IEEE Transactions on Geoscience and Remote Sensing; vol. 25 No. 1, Jan. 1997.

Roger F. Reinking et al., Evaluation of a 45 degree Slant Quasi0Linear . . . , Journal of Atmospheric and Oceanic Technology, vol. 19, pp. 296-321.

Yoshio Yamaguchi et al., Four-Component Scattering Model for Polarimetric SAR . . . ; IEEE Transactions on Geoscience and Remote Sensing, vol. 43, No. 8, Aug. 2005.

Jakob J. van Zuyl et al., Imaging Radar Polarization Signatures: Theory and Observation; Radio Science, vol. 22, No. 4, pp. 529-543, Jul.-Aug. 1987.

Martin A. Slade, et al.; Mercury Radar Imaging: Evidence for Polar Ice; Source: Science, New Series, vol. 258, No. 5082 (Oct. 23, 1992), pp. 635-640.

Albert Guissard, Mueller and Kennaugh Matrices in Radar Polarimetry, IEEE Transactions on Geoscience and Remote Sensing, vol., 32, No. 3, May 1994.

Sergey Y. Matrosov, On the Use of Radar Depolarization Ratios for Estimating . . . ; 2001 American Meteorgological Society, vol. 40, pp. 479-490.

Ridha Touzi et al., On the Useof Permanent Symmetric Scatterers for Ship Characterization; IEEE Transactions on Geoscience on Remote Sensing, vol. 42, No. 10, Oct. 2004.

Jong-Sen Lee et al., Unsupervised Terrain Classification Preserving Polarimetric . . . ; IEEE Transactions on Geoscience and Remote Sensing, vol. 42, No. 4, Apr. 2004.

Carlos Lopez-Martinez et al., Statistical Assessment of Eigenvector-Based . . . ; IEEE Transactions on Geoscience and Remote Sensing, vol. 43, No. 9, Sep. 2005.

Jong-Sen Lee et al., Polarimetric SAR Data Compensation for Terrain . . . ; IEEE Transactions of Geoscience and Remote Sensing, vol. 38, No. 5, Sep. 2000.

Shane Robert Cloude et al., A Review of Target Decomposition Theorems . . . ; IEEE Transactions on Geoscience and Remot Sensing, vol. 34, No. 2, Mar. 1996.

Lynn M. Carter et al., Impact Crater Related Surficial Deposits on Venus: . . . ; Journal of Geophysical Research, vol. 109, E060009, doi: 10.1029/2003JE002227, 2004.

Enrico Torlaschi et al., Alternate Transmission of +45 degree and −45 degree . . . ; Journal of Atmospheric and Oceanic Technology, vol. 17, pp. 1066-1076.

N.J.S. Stacy et al., Stokes Vector Analysis of Lunar Radar Backscatter; pp. 30-32.

Jean-Claude Souyris et al., Compact Polarimetry Based on Symmetry Properties . . . ; IEEE Transactions on Geoscience and Remote Sensing, vol. 43, No. 3 Mar. 2005, pp. 634-646.

Rafael Zandona Schneider et al., Polarimetric and Interferometric Characterization . . . ; IEEE Transactions on Geoscience and Remote Sensing, vol. 44, No. 4, Apr. 2006.

R. Touzi et al., A rview of polarimetry in the context of synthetic aperture radar: concepts and . . . ; Can. J. Remote Sensing, vol. 30, No. 3, pp. 380-407, 2004.

* cited by examiner

POLARIMETRIC SELECTIVITY METHOD FOR SUPPRESSING CROSS-TRACK CLUTTER IN SOUNDING RADARS

CROSS-REFERENCE TO RELATED APPLICATIONS

This application claims the benefit of prior filed, co-pending U.S. provisional application No. 60/938,226, filed on May 16, 2007, which is incorporated herein by reference in its entirety.

STATE OF GOVERNMENTAL INTEREST

This invention was made with Government support under National Aeronautics and Space Administration grant no. NNG05GL65G. The Government has certain rights in the invention.

BACKGROUND OF THE INVENTION

1. Field of the Invention

The present invention relates generally to sounding radars and, more particularly, to methods for suppressing cross-track clutter by distinguishing between "signal" and "clutter" based on differences in their polarimetric signatures.

2. Description of the Related Art

Sounding by a down-looking radar from a large stand-off range, as from a high-altitude aircraft or an orbiting spacecraft measures reflectivity as a function of penetration into a medium such as ice sheets or dry soil. Sounding radars generally use long wavelengths (often six meters or more), since penetration depth increases in proportion to wavelength. As a consequence, the width of the antenna pattern tends to be large in both the along-track direction and the cross-track direction.

The intended direction of measurement is at nadir (directly below the radar), but the wide antenna pattern illuminates large areas of terrain from which strong reflections may arrive at the radar at the same time as the intended reflections (desired signals) from layers internal to the sounding medium. These desired reflections (signals) are relatively weak, and may be obscured by the off-nadir returns. The latter are known as clutter.

Offending clutter returns in the along-track direction may be suppressed or avoided by partially-coherent Doppler processing. However, the clutter that arises from off-nadir reflections in the cross-track direction remain problematic and in many applications becomes the dominant factor limiting radar sounding performance.

As is well known, right-circular "R" and left-circular "L" fields are orthogonally polarized with respect to each other. In response to illumination by a circularly polarized EM field, the dominant sense of received circular polarization is opposite to the transmitted sense. (Thus the paradox: for circularly polarized radars the "like-polarized" and "cross-polarized" concepts are reversed relative to the more familiar case for linear polarizations.)

Transmitting R usually results in L-polarized backscatter being stronger, so that R becomes the cross-polarized receive state. This is because odd-bounce reflection usually dominates, as from specular surfaces, Bragg scattering from a distributed scene, or trihedrals (3-sided corners, either natural or fabricated).

In contrast, double-bounce backscatter, such as from dihedral reflectors, imposes an even number of phase reversals in the linear EM component that is aligned with the dihedral's axis, in which case stronger backscatter is observed in the same-sense circular polarity. Double-bounce reflections of circularly-polarized waves are indicated rather sensitively through their corresponding Stokes parameters, specifically, their relative phase. In the case of a lossless dihedral, the phase would differ by 180° relative to that from a single-bounce scattering surface or from alternative odd-bounce shapes.

Sounding radars need to be designed to take advantage of the different polarization characteristics of "signal" and "clutter". The fundamental property to be exploited is that backscatter from (layers at) depth is single-bounce, whereas off-nadir clutter is usually dominated by double-bounce reflections. A generalized version of this property is that the desired depth signals retain polarization characteristics that differ from those of clutter. What is needed then are polarimetric clutter suppression methods that depend on the extent of polarization differences, and the ability to predict them (or to recognize and adapt to them through dynamic processing algorithms).

SUMMARY OF THE INVENTION

Therefore, the present invention has been made in view of the above problems, and it is an objective of the present invention to provide methods to suppress clutter in sounding radars.

The invention comprises two polarimetric methods either of which can significantly reduce the cross-track clutter level relative to the desired sounding signals from depth. Both inventive methods take advantage of a hybrid-polarity method and architecture that provides a circularly-polarized transmitted field, and a coherent dual-polarized receiver. The resulting data are sufficient to fully characterize the backscattered field, for which the four Stokes parameters are one effective manifestation.

Cross-track clutter suppression follows from processing strategies that are designed to distinguish between "signal" and "clutter" based on differences in their polarimetric signatures. The first method utilizes an antenna pattern that is circularly polarized over the full antenna beamwidth. The second sets up the antenna such that the field radiated at boresight is circularly polarized, but in the cross-track off-nadir directions the field is elliptically polarized.

More specifically, the first method for suppressing cross-track clutter in a sounding radar comprises the steps of: transmitting a circularly polarized electromagnetic (EM) field over a full beamwidth of an antenna pattern; receiving a coherently dual-polarized backscattered field containing cross-track clutter and a desired signal having different polarizations; using data embedded in the received backscattered field to calculate Stokes parameters that characterize the receive backscattered field; using the calculated Stokes parameters to identify the polarizations of the desired signal and the cross-track clutter; and suppressing the cross-track clutter using the difference in polarization between the cross-track clutter and the desired signal.

The second method for suppressing cross-track clutter in a sounding radar comprises the steps of: transmitting an electromagnetic (EM) field, having a first polarization at the radar's nadir and an EM field having a second polarization; at the radar's off-nadir regions; receiving a coherently dual-polarized backscattered field, wherein backscatter received from the nadir retains the first polarization and backscatter received from the off-nadir regions retains the second polarization; using data embedded in the received backscattered field to calculate the Stokes parameters; using the calculated Stokes parameters to distribute the data according to the extent of the second polarization; and suppressing the second polarization using a passband centered on the first polarization.

BRIEF DESCRIPTION OF THE DRAWINGS

These and other objects, features and advantages of the invention will be apparent from a consideration of the following Detailed Description considered in conjunction with the drawing Figures, in which.

DETAILED DESCRIPTION

Figure 1:
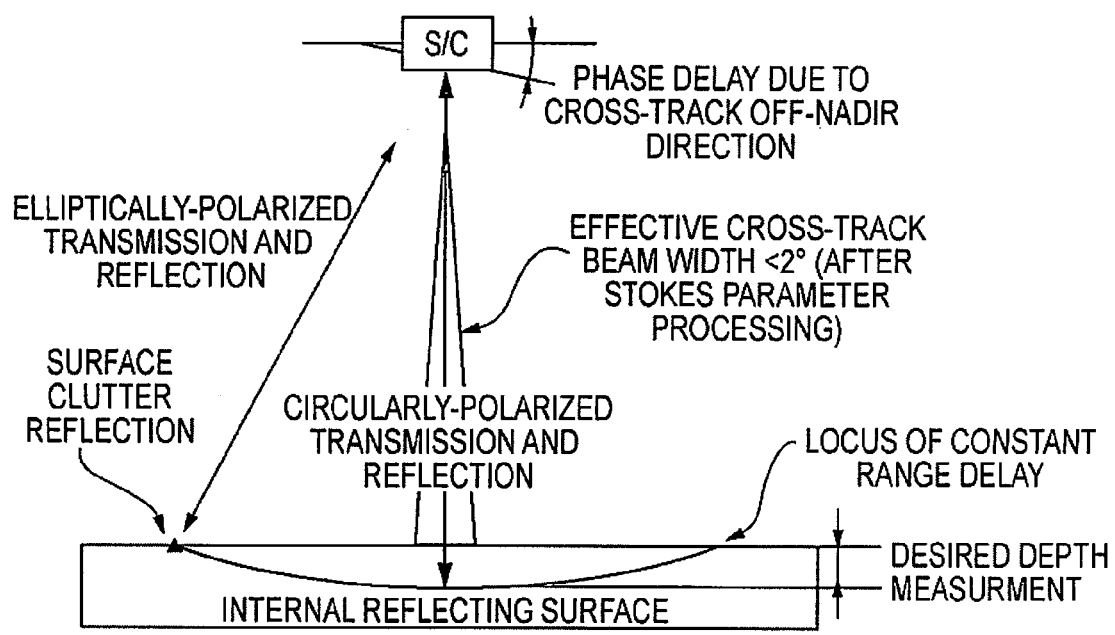
FIG. 1 is a schematic view of the cross-track plane of a space-based sounding radar.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The hybrid-polarity method and architecture summarized below is discussed more fully in U.S. patent application Ser. No. 12/116,357, filed May 7, 2008 which is incorporated herein by reference in its entirety.

Given that the transmitted polarization is circular, it would be natural to assume that the radar must be circularly polarized on receive. However, if the radar is coherently dual-polarized, then one form of its fundamental data product is the set of four Stokes parameters. The value of these parameters does not depend on the polarimetric basis in which they may be calculated. It follows that choice of the polarization plan for the receiver is arbitrary, as long as it comprises an orthogonal basis.

One alternative is to design the receiver around the linearly-polarized basis, popularly known as "H" and "V". This approach makes sense in practice, since a circularly polarized radiated field often is generated by driving two orthogonal linearly polarized antenna elements simultaneously, and 90° out of phase. Following such transmission, a hybrid-polarity radar simply retains the signals from the two linearly-polarized receive channels, rather than forcing them back into "same-sense" and "opposite sense" circularly-polarized representations. (In the radar sounding context, it is convenient to refer to the linear antenna elements as "H" and "V", although the implied orientation with respect to the Earth's surface is meaningless when oriented toward nadir.)

As discussed in U.S. patent application Ser. No. 12/116,357, the hybrid-polarity architecture offers several advantages over more conventional "like and cross" dual-polarized implementations, in addition to the inventive measurement and discrimination features described below.

In the first inventive method, full-beam circular polarization, let the transmitted field be circularly polarized in the conventional sense, having an axial ratio close to unity (near-perfect circular polarization) over the full beamwidth of the antenna pattern. Further, let the receiver be coherently dual-polarized. Then the resulting data are sufficient to calculate the Stokes parameters that characterize the observed backscattered field.

In the ideal situation, signals from depth will be single-bounce, thus polarized in the sense opposite to that which was transmitted. Off-nadir clutter will be dominated by double-bounce reflections, thus polarized in the same sense as that which was transmitted. In this simplified case, the clutter and signal will be at orthogonal polarizations and, hence, be characterized by a 180° phase separation in Stokes parameter space. Such clutter can be easily suppressed.

Radar sounders tend to favor very long wavelengths, such as six meters or more. Their reflections from depth tend to be dominated by specular (coherent) backscatter, which reverses the sense of illuminating circular polarization.

Clutter could arise from large flat areas off-nadir, but to generate strong backscatter these would have to be tilted such that their surfaces were orthogonal to the radar's line-of-sight. The most likely class of off-nadir clutter would be double bounce. The inventive method will be effective under these conditions. This method would be most applicable to planetary (or lunar) radar sounders, for which choice of wavelength (or, equivalently, frequency) is relatively unconstrained, and the precedents all have very long wavelengths.

The situation is more complex at shorter wavelengths, such as 70 cm (corresponding to 435 MHz, the lowest frequency authorized by international protocol for radar sounding of the Earth). At this wavelength, it has been observed over continental ice sheets that scattering from internal layers is not purely specular, and clutter returns are not necessarily dominated by double bounce. However, even under these circumstances, the inventive polarimetric selectivity method remains as a potentially powerful tool, as long as (1) the dominant characteristics of signal and clutter differ sufficiently, and (2) their respective polarimetric signatures can be identified, then subjected to an algorithm designed to enhance signals, and to suppress the clutter.

The second inventive method involves the use of partial elliptical polarization as discussed below. In anticipation of sounding applications for which the signal and clutter polarimetric characteristics are complex, it may be advantageous to design the radar to illuminate the off-nadir regions with a polarization that differs from that at nadir. As shown in FIG. 1, one way to accomplish that is to constrain the transmitted electromagnetic (EM) field to be circularly-polarized only in the nadir direction. As the viewing angle in the off-nadir direction from the radar diverges from zero, the antenna array is arranged such that the transmit and receive polarizations naturally become increasingly elliptical. Thus, reflections from off-nadir reflections are dominated by elliptical polarization, rather than circular.

The key to this antenna plan is linearly-polarized elements, separated in the plane in which beam selectivity is required. Upon reception, the radar measures two mutually orthogonal (linearly) polarized components of the backscattered field, including their relative phase.

The received data are transformed into the four Stokes parameters. The Stokes parameters are parsed to distribute all data according to the extent of their elliptical polarization. In the canonic case, in which the reflections from nadir retain circular polarization, off-nadir clutter will be dominated by elliptically-polarized signatures. Such clutter returns may be suppressed by a passband (filter) centered on circular polarization.

It is well known that simultaneously transmitting orthogonal linearly-polarized signals from a pair of antennas whose phase centers are co-located radiates a circularly-polarized EM field. In the present embodiment, however, the antenna elements comprising the two linear polarizations are intentionally separated, by a baseline in the cross-track direction. If these elements are driven 90° out of phase, the radiation along their joint boresight towards nadir will be circularly polarized.

Off-nadir, the extra range r for all angles suffered by the longer path to the further antenna imposes an additional oneway phase delay $\Phi=2\pi\Delta r/\lambda$. The result is elliptically-polarized fields in the off-nadir directions. The geometry is reciprocal: backscatter received from off-nadir sources will appear to be elliptically polarized. Normalizing the baseline by (mean) wavelength, it turns out that the optimum separation between the two orthogonally-polarize antenna arrays (or elements) is on the order of one-half wavelength.

In general, suppression of elliptically-polarized clutter is not total, except for the case in which the clutter return and the depth returns are orthogonally polarized with respect to each other. That is because of a fundamental (conservation of energy) principle: any elliptically polarized field can be represented as the sum of two circularly polarized constituents, of opposite sense, and differing weights. Therefore, the extent of clutter suppression depends on the relative disposition of its energy between the two senses of circular polarization. On average, the suppression will be on the order of 3 dB, although at best it could be many 10s of dB.

The discussion above uses as an example the Stokes parameters to represent or characterize the received backscattered field; however, a 2×2 coherency matrix or any representation that is a complete embodiment of the observable properties of the received backscattered field can be used instead of the Stokes parameters.

The inventive polarimetric selectivity methods discussed above offer new alternatives for means of suppressing off-nadir clutter for any radar sounding instrument. Initial analysis shows that relatively simple radar hardware in a suitable architecture can lead to marked improvement in reducing the radar's susceptibility to non-nadir backscatter. As a result, there will be significant improvement in the visibility of returns from internal layers, and fewer troublesome ambiguities.

While the invention has been described with reference to example embodiments, it will be understood by those skilled in the art that a variety of modifications, additions and deletions are within the scope of the invention, as defined by the following claims.

What is claimed is:

1. A method for suppressing cross-track clutter in a sounding radar comprising the steps of:
    transmitting a circularly polarized electromagnetic (EM) field over a full beamwidth of an antenna pattern;
    receiving a coherently dual-polarized backscattered field containing cross-track clutter and a desired signal having different polarizations;
    using data embedded in the received backscattered field to calculate Stokes parameters that characterize the receive backscattered field;
    using the calculated Stokes parameters to identify the polarizations of the desired signal and the cross-track clutter; and
    suppressing the cross-track clutter using the difference in polarization between the cross-track clutter and the desired signal.

2. The method as recited in claim 1, wherein in the using data and using the calculated Stokes parameters steps, instead of the Stokes parameters, a 2×2 coherency matrix is calculated and used to identify the polarizations.

3. The method as recited in claim 1, wherein in the using data and using the calculated Stokes paramters steps, instead of the Stokes parameters, a representation that is a complete embodiment of the observable properties of the received backscattered field is calculated and used to identify the polarizations.

4. A method for suppressing cross-track clutter in a sounding radar comprising the steps of:
    transmitting an electromagnetic (EM) field, having a first polarization at the radar's nadir and an EM field having a second polarization; at the radar's off-nadir regions;
    receiving a coherently dual-polarized backscattered field, wherein backscatter received from the nadir retains the first polarization and backscatter received from the off-nadir regions retains the second polarization;
    using data embedded in the received backscattered field to calculate the Stokes parameters;
    using the calculated Stokes parameters to distribute the data according to the extent of the second polarization; and
    suppressing the second polarization using a passband centered on the first polarization.

5. The method as recited in claim 4, wherein the first polarization is circular and the second polarization is elliptical.

6. The method as recited in claim 4, wherein in the using data and using the calculated Stokes parameters steps, instead of the Stokes parameters, a 2×2 coherency matrix is calculated and used to distribute the data according to the extent of the second polarization.

7. The method as recited in claim 4, wherein in the using data and using the calculated Stokes parameters steps, instead of Stokes parameters, a representation that is a complete embodiment of the observable properties of the received backscattered field is calculated and used to distribute the data according to the extent of the second polarization.

* * * * *